US009099059B2

(12) United States Patent
Sato

(10) Patent No.: US 9,099,059 B2
(45) Date of Patent: Aug. 4, 2015

(54) IMAGE DISPLAY DEVICE, IMAGE DISPLAY METHOD, INFORMATION PROCESSING DEVICE, INFORMATION PROCESSING METHOD, AND INFORMATION STORING MEDIUM

(75) Inventor: Koichi Sato, Tokyo (JP)

(73) Assignees: Sony Corporation, Tokyo (JP); Sony Computer Entertainment, Tokyo (JP)

( * ) Notice: Subject to any disclaimer, the term of this patent is extended or adjusted under 35 U.S.C. 154(b) by 596 days.

(21) Appl. No.: 12/298,124

(22) PCT Filed: Nov. 20, 2006

(86) PCT No.: PCT/JP2006/323078
§ 371 (c)(1),
(2), (4) Date: Feb. 26, 2009

(87) PCT Pub. No.: WO2007/122762
PCT Pub. Date: Nov. 1, 2007

(65) Prior Publication Data
US 2009/0295977 A1 Dec. 3, 2009

(30) Foreign Application Priority Data
Apr. 25, 2006 (JP) ................. 2006-120960

(51) Int. Cl.
G09G 5/395 (2006.01)
G06F 3/147 (2006.01)
G09G 5/36 (2006.01)

(52) U.S. Cl.
CPC ............... G09G 5/395 (2013.01); G06F 3/147 (2013.01); G09G 5/36 (2013.01); G09G 2340/02 (2013.01); G09G 2340/0407 (2013.01); G09G 2380/16 (2013.01)

(58) Field of Classification Search
CPC ............. H04N 2007/145; G06F 12/0862; G06F 12/0875; G06F 17/30988; G09G 2360/121; G06T 1/60
See application file for complete search history.

(56) References Cited

U.S. PATENT DOCUMENTS

2004/0186371 A1* 9/2004 Toda .............................. 600/407
2006/0071947 A1* 4/2006 Ubillos et al. ................. 345/648
2007/0067798 A1* 3/2007 Wroblewski ................... 725/37

FOREIGN PATENT DOCUMENTS

JP 63-098780 4/1988
JP 04-337877 11/1992

(Continued)

OTHER PUBLICATIONS

Patent Cooperation Treaty; "Notification of Transmittal of Copies of Translation of the International Preliminary Report on Patentability" issued in corresponding International Application No. PCT/JP2006/323078; dated Nov. 27, 2008; 1 page.

(Continued)

Primary Examiner — Kee M Tung
Assistant Examiner — Haixia Du
(74) Attorney, Agent, or Firm — Fitch, Even, Tabin & Flannery, LLP

(57) ABSTRACT

To provide an image display device capable of carrying out a data reading process in advance on data of a plurality of images in an order according to the likelihood of becoming a display target. There is provided an image display device for displaying on a display device (2) an image in accordance with a position change instruction issued by a user to change a position in an image sequence comprising a plurality of images, the image display device holds information about a display image position which is a position in the image sequence, of an image to be displayed next and determined according to an image being displayed on the display device (2) and the position change instruction; reads, with respect to respective images in a plurality of positions in the image sequence, the positions being determined according to the display image position, data of the respective images from an image data storage unit in an order determined according to content of the position change instruction, the image data storage unit storing data of the plurality of images; and displays an image in accordance with the position change instruction by a user, based on the read image data.

18 Claims, 8 Drawing Sheets

(56) References Cited

FOREIGN PATENT DOCUMENTS

| | | | |
|---|---|---|---|
| JP | 10-240449 | | 9/1998 |
| JP | 2001-249653 | | 9/2001 |
| JP | 2001249653 | A * | 9/2001 |
| JP | 2002-063034 | | 2/2002 |
| JP | 2002063034 | A * | 2/2002 |
| JP | 2002-271814 | | 9/2002 |
| JP | 2003-066941 | | 3/2003 |
| JP | 2004-336681 | A | 11/2004 |
| JP | 2005-020209 | A | 1/2005 |
| JP | 2006-163218 | A | 6/2006 |

OTHER PUBLICATIONS

Patent Cooperation Treaty; "International Preliminary Report on Patentability" issued in corresponding International Application No. PCT/JP2006/323078; dated Nov. 17, 2008; 15 pages.

Patent Cooperation Treaty; "Written Opinion of the International Searching Authority" issued in corresponding International Application No. PCT/JP2006/323078; dated Feb. 27, 2007; 13 pages.

Japanese Patent Office; "International Search Report" issued in corresponding International Application No. PCT/JP2006/323078; dated Feb. 27, 2007; 4 pages.

Japanese Patent Office, Office Action in corresponding Japanese Application No. 2006-120960, dated Jan. 31, 2012, 5 pages (partial English translation included).

Japanese Patent Office; Office Action issued in corresponding Japanese Patent Application No. 2006-120960, dated Jul. 3, 2012, 3 pages (partial English translation included).

* cited by examiner

FIG.5

| AREA IDENTIFICATION INFORMATION | IMAGE IDENTIFICATION INFORMATION | STATUS INFORMATION |
|---|---|---|
| UNIT STORAGE AREA B1a | I (p) | IN CONVERSION PROCESSING |
| UNIT STORAGE AREA B1b | I (p+1) | READING PROCESS COMPLETED |
| UNIT STORAGE AREA B1c | I (p-1) | IN READING PROCESSING |
| ⋮ | ⋮ | ⋮ |

IMAGE DISPLAY DEVICE, IMAGE DISPLAY METHOD, INFORMATION PROCESSING DEVICE, INFORMATION PROCESSING METHOD, AND INFORMATION STORING MEDIUM

TECHNICAL FIELD

The present invention relates to an image display device, an image display method, and an information storage medium for displaying a plurality of images, and an information processing device, an information processing method, and an information storage medium for carrying out processing on a plurality of process target data.

BACKGROUND ART

There is available an image display device for reading data of a plurality of images stored in a storage means such as a hard disk drive and the like and displaying an image, among the plurality of images, in accordance with an operation instruction issued by a user to change the display image (a display target change instruction) on a display means such as a display and the like. According to the above described image display device, the user can see a plurality of images by sequentially displaying the images captured on, e.g., a digital camera or the like on a display means according to a display target change instruction.

In the above described image display device, image data stored in a storage means needs to be read and converted into a display data format, and such a pre-display process may take time. Consequently, a user attempting sequential displaying of images may be forced to wait when changing display images because the pre-display process cannot keep up with the speed. In view of the above, there is available a technique for carrying out the pre-display process on data of a possible next display target image before a user issues a display target change instruction, the pre-display process including a data reading process, a data format conversion process, and the like.

DISCLOSURE OF INVENTION

According to the above described technique, image data on which the data reading process is carried out in advance is fixed to an image which is determined according to the image being displayed on the display means at the time of carrying out the data reading process, and the order in which to read the images is also fixed. Thus, the image data is not necessarily read in an order according to higher likelihood of becoming a display target. As a result, there may be a case in which the data reading process cannot keep up with the speed, depending on the content of a display target change instruction issued by a user.

Also, in conversion of the image data read by the image display device into a display data format, when the image data having been converted into the display data format has a large data size, it may take time to transfer such image data within the image display device, and resultantly, the user may be similarly forced to wait when changing the display images. However, use of a data format for a smaller data size as a display data format after conversion may result in deterioration in the information of the original image data, leading to inferior image quality to that for a data format for a larger data size.

Also, in the case where the above described pre-display process is carried out in advance, a target image of the pre-display process may be changed in response to a display target change instruction by a user while the pre-display process is being carried out. In such a case, the process proceeds intact to the data format conversion process even though, e.g., a target image of the pre-display process is changed during the data reading process for a certain image. Thus, an extra process is resultantly carried out. Moreover, it is not possible to carry out the pre-display process on an image which newly becomes a target image of the pre-display process until the data format conversion process for the image in processing is completed. As a result, the user is similarly forced to wait because it is not possible to complete the pre-display process in advance for the image having become a display target in response to the display target change instruction by the user. In order to address such a problem, a technique is desired for avoiding execution of an extra process as much as possible when carrying out a predetermined process (e.g., a pre-display process) on a plurality of process target data (e.g., image data) according to a priority order, even though the priority order should be changed while the predetermined process is being carried out.

The present invention has been conceived in view of the above, and one of the objects thereof is to provide an image display device, an image display method, and an information storage medium capable of carrying out a data reading process in advance for data of a plurality of images in an order according to the likelihood of becoming a display target.

Also, another object of the present invention is to provide an image display device, an image display method, and an information storage medium capable of reducing waiting time for a user when displaying a plurality of images in response to an instruction by the user and displaying a high quality image as required.

Also, still another object of the present invention is to provide an information processing device, an information processing method, and an information storage medium capable of reducing execution of an extra process when carrying out a predetermined process on a plurality of process target data according to a priority order even when the priority order should be changed while the predetermined process is being carried out.

In order to attain the above described object, according to the present invention, there is provided an image display device for displaying, on display means, an image in accordance with a position change instruction issued by a user to change a position in an image sequence comprising a plurality of images, comprising display image position holding means for holding information about a display image position which is a position in the image sequence, of an image to be displayed next and determined according to an image being displayed on the display means and the position change instruction; reading processing means for carrying out a data reading process for respective images in a plurality of positions in the image sequence, the positions being determined according to the display image position, in which data of the respective images are read from image data storage means in an order determined according to content of the position change instruction, the image data storage means storing data of the plurality of images; and image display control means for displaying an image in accordance with the position change instruction on the display means, based on the read image data.

Also, in the above described image display device, the plurality of positions may be determined according to the content of the position change instruction. Further, the image display device may further comprise process target list holding means for holding a process target list indicating a read target image which is a target on which the data reading process is carried out and an order in which to read the read target image; and process target list update means for updating the process target list according to the position change instruction, wherein the reading processing means carries out the data reading process on the read target image indicated by the process target list in the order indicated by the process target list.

Also, in the above described image display device, the reading processing means may carry out the data reading process in an order determined according to a movement direction of the position in the image sequence, the position being changed according to the position change instruction.

Also, the above described image display device may further comprise data format conversion means for converting, for respective images in the plurality of positions in the image sequence, the positions being determined according to the display image position, data of the respective images read through the data reading process into a display data format in an order determined according to the content of the position change instruction, wherein the image display control means may display an image in accordance with the display target change instruction on the display means, based on the converted image data.

According to the present invention, there is provided an image display method for displaying, on display means, an image in accordance with a position change instruction issued by a user to change a position in an image sequence comprising a plurality of images, comprising a step of storing, in display image position holding means, information about a display image position which is a position in the image sequence, of an image to be displayed next and determined according to an image being displayed on the display means and the position change instruction; a step of carrying out a data reading process for respective images in a plurality of positions in the image sequence, the positions being determined according to the display image position, in which data of the respective images are read from image data storage means in an order determined according to content of the position change instruction, the image data storage means storing data of the plurality of images; and a step of displaying an image in accordance with the position change instruction on the display means, based on the read image data.

According to the present invention, there is provided an information storage medium storing a program for causing a computer to function as an image display device for displaying, on display means, an image in accordance with a position change instruction issued by a user to change a position in an image sequence comprising a plurality of images, the computer functioning as display image position holding means for holding information about a display image position which is a position in the image sequence, of an image to be displayed next and determined according to an image being displayed on the display means and the position change instruction; reading processing means for carrying out a data reading process for respective images in a plurality of positions in the image sequence, the positions being determined according to the display image position, in which data of the respective images are read from image data storage means in an order determined according to content of the position change instruction, the image data storage means storing data of the plurality of images; and image display control means for displaying an image in accordance with the position change instruction on the display means, based on the read image data.

According to the present invention, there is provided an image display device for displaying, on display means, an image in accordance with a display target change instruction issued by a user, among a plurality of images, comprising data format conversion means for, after converting data of at least one conversion target image included in the plurality of images into a first display data format and then storing in a first temporary storage area, converting data of at least one image included in the conversion target images into a second display data format different from the first display data format and then storing in a second temporary storage area different from the first temporary storage area; and image display control means for displaying a display target image in accordance with the display target change instruction on the display means, based on the converted image data, in which the display target image is displayed on the display means based on, when data of the display target image has been converted into the second display data format, the data of the image having been converted into the second display data format, and when the data of the display target image has not been converted into the second display data format, based on the data of the image having been converted into the first display data format.

Also, in the above described image display device, the data of the image having been converted into the first display data format may have a data size smaller than a data size of the data of the image having been converted into the second display data format.

According to the present invention, there is provided an image display method for displaying, on display means, an image in accordance with a display target change instruction issued by a user, among a plurality of images, comprising a step of, after converting data of at least one conversion target image included in the plurality of images into a first display data format and then storing in a first temporary storage area, converting data of at least one image included in the conversion target images into a second display data format different from the first display data format and then storing in a second temporary storage area different from the first temporary storage area; and a step of displaying a display target image in accordance with the display target change instruction on the display means, based on the converted image data, in which the display target image is displayed on the display means based on, when data of the display target image has been converted into the second display data format, the data of the image having been converted into the second display data format, and when the data of the display target image has not been converted into the second display data format, based on the data of the image having been converted into the first display data format.

According to the present invention, there is provided an information storage medium storing a program for causing a computer to function as an image display device for displaying, on display means, an image in accordance with a display target change instruction issued by a user, among a plurality of images, the computer functioning as data format conversion means for, after converting data of at least one conversion target image included in the plurality of images into a first display data format and then storing in a first temporary storage area, converting data of at least one image included in the conversion target images into a second display data format different from the first display data format and then storing in a second temporary storage area different from the first temporary storage area; and image display control means for displaying a display target image in accordance with the display target change instruction on the display means, based on the converted image data, in which the display target image is displayed on the display means based on, when data of the display target image has been converted into the second display data format, the data of the image having been converted into the second display data format, and when the data of the display target image has not been converted into the second display data format, based on the data of the image having been converted into the first display data format.

According to the present invention, there is provided an information processing device for sequentially carrying out a first process and a second process on a plurality of process target data, comprising priority order list holding means for holding a priority order list indicating a priority order for the first and second processes on the plurality of process target data; first process execution means for carrying out the first process on process target data sequentially selected from the plurality of process target data, based on the priority order list, and storing a result of processing in a temporary storage area; priority order list update means for updating the priority order list upon occurrence of a predetermined event; and second process execution means for carrying out the second process on a result of processing sequentially selected from the results of processing stored in the temporary storage area, based on the updated priority order list.

Also, the above described image display device may further comprise image display control means for displaying, on display means, a display target image in accordance with a display target change instruction issued by a user, among a plurality of images, wherein the process target data may be data of the image, the first process may be a data reading process for reading the data of the image from image data storage means for storing data of the plurality of images, the second process may be a data format conversion process for converting the read image data into a display data format, the predetermined event may be the display target change instruction, and the image display control means may display on the display means the display target image, based on the data of the image, the data being converted through the data format conversion process.

According to the present invention, there is provided an information processing method for sequentially carrying out a first process and a second process on a plurality of process target data, comprising a step of holding, in priority order list holding means, a priority order list indicating a priority order for the first and second processes on the plurality of process target data; a step of carrying out the first process on process target data sequentially selected from the plurality of process target data, based on the priority order list, and storing a result of processing in a temporary storage area; a step of updating the priority order list upon occurrence of a predetermined event; and a step of carrying out the second process on a result of processing sequentially selected from the results of processing stored in the temporary storage area, based on the updated priority order list.

According to the present invention, there is provided an information storage medium storing a program for causing a computer to function as an information processing device for sequentially carrying out a first process and a second process on a plurality of process target data, the computer functioning as priority order list holding means for holding a priority order list indicating a priority order for the first and second processes on the plurality of process target data; first process execution means for carrying out the first process on process target data sequentially selected from the plurality of process target data, based on the priority order list, and storing a result of processing in a temporary storage area; priority order list update means for updating the priority order list upon occurrence of a predetermined event; and second process execution means for carrying out the second process on a result of processing sequentially selected from the results of processing stored in the temporary storage area, based on the updated priority order list.

In the above described description, the computer may be, e.g., a content player, a consumer game device, a portable game device, a commercial game device, a personal computer, a server computer, a portable phone, and the like. Also the information storage medium may be various computer readable information storage media, such as a CD-ROM, a DVD-ROM, and the like.

BRIEF DESCRIPTION OF DRAWINGS

FIG. 5 is a diagram showing one example of a storage area managing table;

BEST MODE FOR CARRYING OUT THE INVENTION

Figure 1:
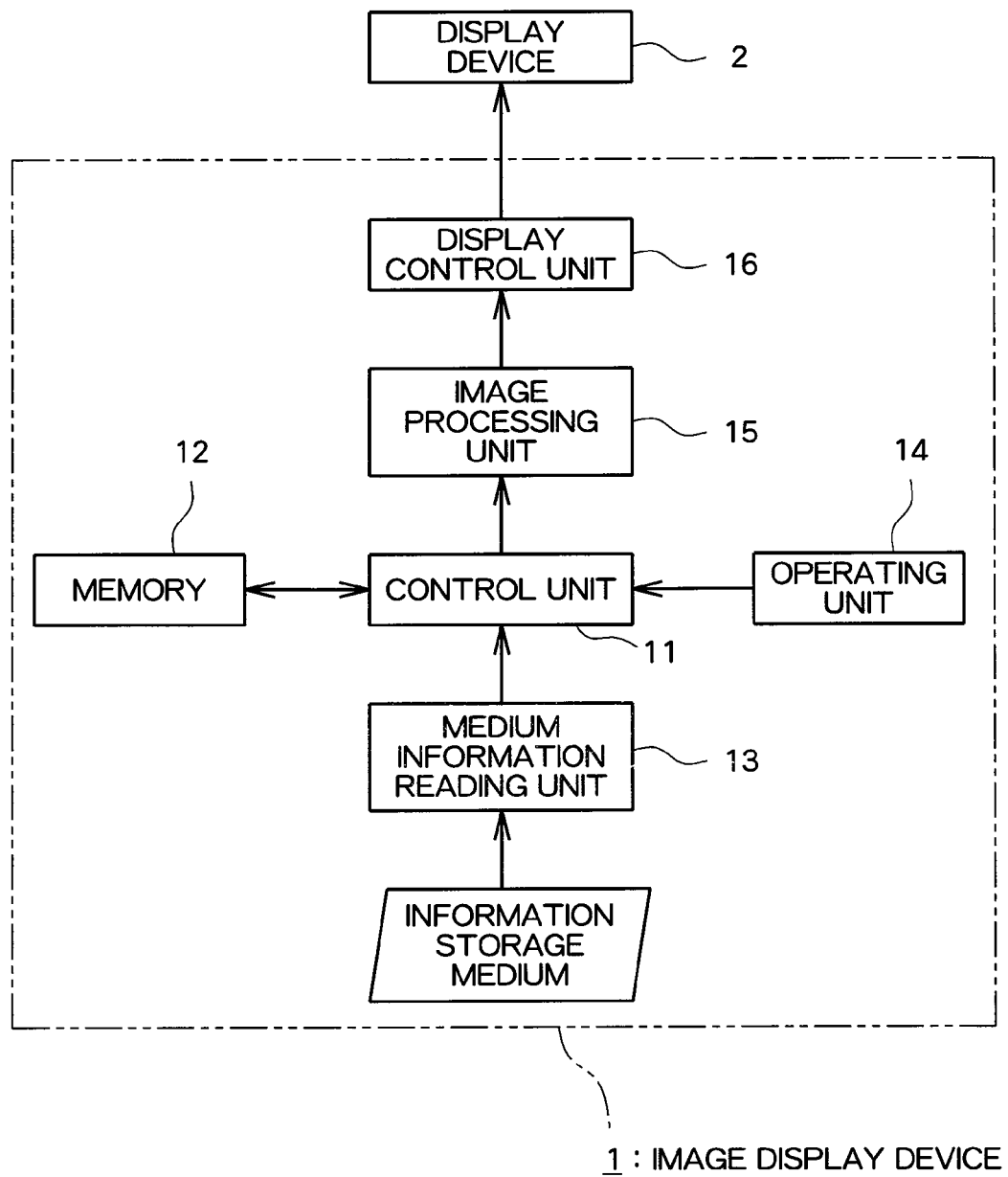
FIG. 1 is a block diagram showing an example of a structure of an image display device according to an embodiment of the present invention.

In the following, an embodiment of the present invention will be described with reference to the accompanying drawings. As shown in FIG. 1, an image display device 1 according to one embodiment of the present invention comprises a control unit 11, a memory 12, a medium information reading unit 13, an operating unit 14, an image processing unit 15, and a display control unit 16, and is connected via the display control unit 16 to a display device 2. The image display device 1 corresponds also to an information processing device according to the present invention.

The control unit 11 is a CPU and the like and operates according to a program stored in the memory 12. Note that the control unit 11 may comprise a plurality of processors. The control unit 11 here carries out a pre-display process in which image data stored in an information storage medium is read via the medium information reading unit 13 and converted into a display data format. Then, an image display control process is carried out based on the image data obtained through the pre-display process, to display an image in accordance with a display target change instruction issued by a user to the operating unit 14 on the display device 2. Details of a process carried out by the control unit 11 in this embodiment will be described later.

The memory 12 comprises a memory element, such as, e.g., RAM, ROM, and the like, and holds a program to be executed by the control unit 11. The memory 12 also includes a temporary storage area to be used as a working memory of the control unit 11.

The medium information reading unit 13 reads data stored in a computer readable information storage medium and outputs the read data to the control unit 11. Note that the information storage medium here may be a disk device such as, e.g., a hard disk, a CD-ROM, a DVD-ROM, and the like, or a semiconductor memory and the like such as a memory stick (registered trademark) and the like. Alternatively, the information storage medium may be a storage device and the like connected via a communication network to the image display device 1. In this embodiment, the information storage medium stores data of a plurality of images to become display targets for the image display device 1.

The operating unit 14, having received an instruction operation by a user, outputs the content of the instruction operation to the control unit 11. The operating unit 14 may be, e.g., a keyboard or a mouse or a controller and the like of a consumer game device.

The image processing unit 15 comprises a graphic processor and carries out a rendering process according to an instruction from the control unit 11. The image processing unit 15 here receives image data having been converted into a display data format from the control unit 11 and carries out a process, such as size conversion and the like, for displaying on the display device 2. The result of the rendering processing by the image processing unit 15 is output to the display control unit 16.

The display control unit 16 converts the result of the rendering process output from the image processing unit 15 into an image signal and outputs to the display device 2 such as a display device, a home-use television set, and the like. The display device 2 may be, e.g., a display device, a home-use television set, and the like, and corresponds to the display means according to the present invention. The display device 2 displays an image on a screen, based on the image signal output from the display control unit 16.

In the following, a function realized by the image display device 1 will be outlined. As described above, the image display device 1 carries out a pre-display process on data selected from among the data of a plurality of images (process target data) stored in an information storage medium. Specifically, here, with respect to data selected from among the plurality of image data, the image display device 1 sequentially carries out a data reading process (a first process) for reading the data from an information storage medium and a data format conversion process (a second process) for converting the read data into a predetermined display data format. Then, based on the image data obtained through the pre-display process, an image in accordance with a display target change instruction issued by a user to the operating unit 14 is displayed on the display device 2.

It is assumed here that the plurality of images to become display targets constitute an image sequence L indicating a predetermined order. For example, the image sequence L may indicate an order in which the respective image data is stored in an information storage medium or an order based on file names or date information associated with the respective image data. In the following, a plurality of images constituting the image sequence L are denoted as I(1), I(2), ..., I(p), and so on; data of the respective images are denoted as D(1), D(2), ..., D(p), and so on.

Further, it is assumed in this case that a display target change instruction issued by a user to the operating unit 14 is a position change instruction to change a position in the image sequence L. As a specific example, assuming that the operating unit 14 has an upper direction button for the up direction and a lower direction button for the down direction, the upper direction button is made to correspond to the backward direction of an image sequence L and the lower direction button is made to correspond to the forward direction of the image sequence L. In this case, an instruction operation made by a user by pressing the lower direction button constitutes an instruction to display an image advanced by one in the image sequence L (hereinafter referred to as a forward direction instruction) and an instruction operation by pressing the upper direction button constitutes an instruction to display an image receded by one in the image sequence L (hereinafter referred to as a backward direction instruction).

Figure 2:
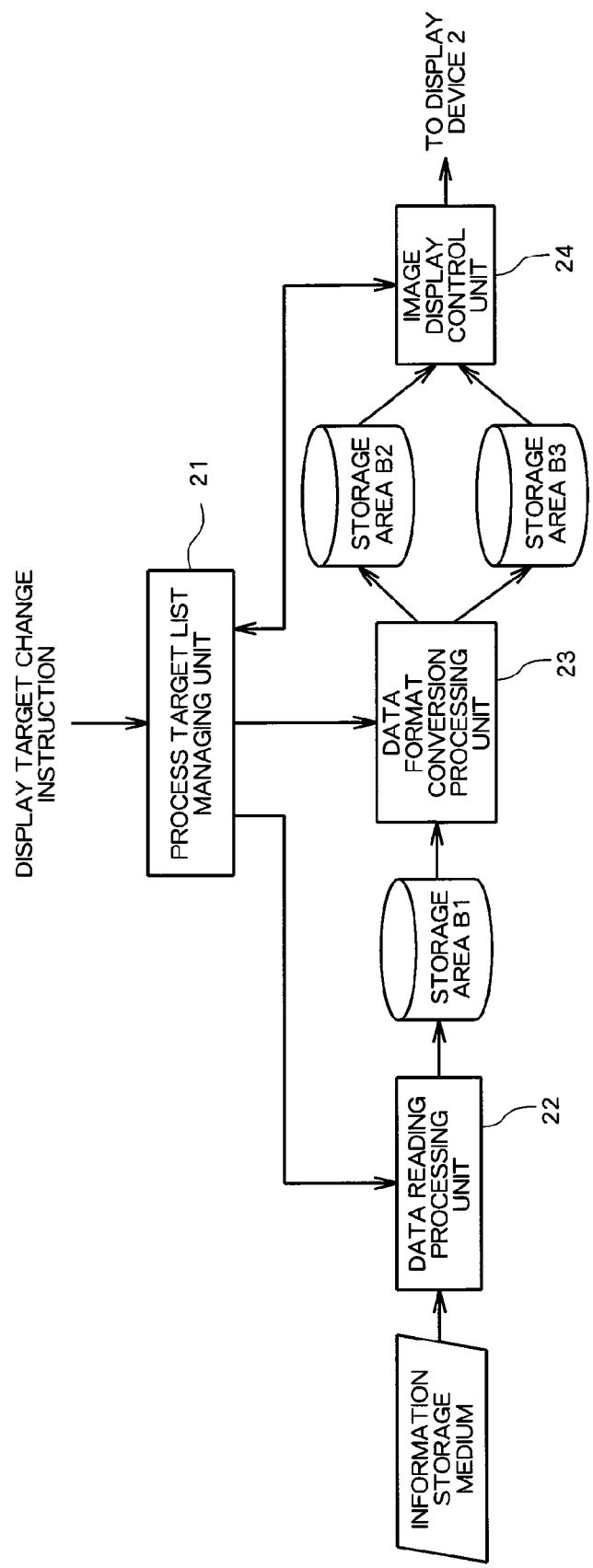
FIG. 2 is a functional block diagram showing one example of the image display device according to the embodiment of the present invention.

Subsequently, details of the respective functions realized by the image display device 1 will be described. As shown in FIG. 2, the image display device 1 comprises, in terms of function, a process target list managing unit 21 for managing a process target list and display image position information, a data reading processing unit 22 for carrying out a data reading process for reading image data from an information storage medium, a data format conversion processing unit 23 for carrying out a data format conversion process for converting the read data into a display data format, and an image display control unit 24 for carrying out an image display control process for displaying an image on the display device 2 based on the converted data. It should be noted that these processes may be carried out simultaneously through processes or threads activated in parallel. Also, in the case where the control unit 11 comprises a plurality of processors, at least some of the processes may be carried out by a specific processor. For example, in the case where the control unit 11 comprises a processor which is particularly suitable for a predetermined operation, that processor may carry out the data format conversion process.

Figure 3:
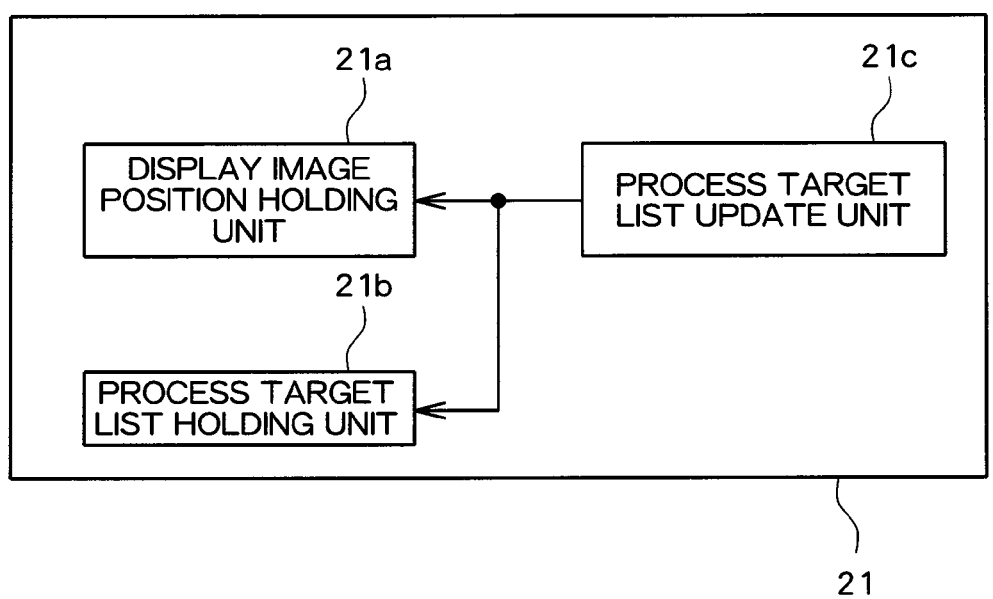
FIG. 3 is a functional block diagram showing one example of a function of a process target list managing unit.

Initially, the process target list managing unit 21 will be described. The process target list managing unit 21 manages a process target list and display image position information, which are used in determining image data to be processed by the data reading processing unit 22, data format conversion processing unit 23, and image display control unit 24, all to be described later. As shown in FIG. 3, the process target list managing unit 21 comprises, in terms of function, a display image position holding unit 21a, a process target list holding unit 21b, and a process target list update unit 21c.

The display image position holding unit 21a holds information about a position (a display image position) in an image sequence L, of an image (a display target image) to be displayed next, the position being determined based on the image being displayed on the display device 2 and a position change instruction issued by a user. The display image position holding unit 21a can be realized using the memory 12. It is assumed here that the display image position information is a value indicating that the relevant image is the $n^{th}$ number in an image sequence L, counted from the head of the image sequence L. The display image position information held in the display image position holding unit 21a is updated, together with the process target list, by the process target list update unit 21c to be described later.

The process target list holding unit 21b holds a process target list (a priority order list) which indicates a priority order for a data reading process to be carried out by the data reading processing unit 22. The process target list holding unit 21b can also be realized using the memory 12. Specifically, the process target list is a list showing read target images on which the data reading process is carried out and an order in which the read target images are read.

Also, the process target list may show, in addition to the priority order for the data reading process, a priority order for the data format conversion process to be carried out by the data format conversion processing unit 23. In this case, the process target list is a list showing conversion target images to which the data format conversion process is carried out and an order in which the conversion process is carried out on the conversion target images.

The process target list update unit 21c updates the display image position information held in the display image position holding unit 21a and the process target list held in the process target list holding unit 21b according to the information notified by the image display control unit 24, indicating that an image display control process for displaying a new image on the display device 2 has been carried out and a display target change instruction issued by a user to the operating unit 14. The process target list update unit 21c can be realized using the control unit 11 and memory 12.

As a specific example, the process target list update unit 21c obtains key buffer information describing the content of a position change instruction issued by a user to the operating unit 14 and stores the key buffer information in the memory 12. The display image position information is updated according to the obtained key buffer information. That is, when a forward direction instruction is newly issued with no position change instruction remaining unprocessed since images in accordance with the position change instructions issued thus far have all already been displayed on the display device 2, one is added to the display image position information. Meanwhile, when a backward direction instruction is issued instead, one is subtracted from the display image position information. When the image display control unit 24 notifies information indicating that a process for displaying an image indicated by a display image position has been carried out, determination is made as to whether or not there is any unprocessed position change instruction, or an instruction not yet used in updating the display image position, held in the key buffer information. With any unprocessed position change instruction remaining, the display image position information is updated according to the oldest one of the unprocessed position change instructions, and the oldest one is then changed to "processed". Through this processing, even when, e.g., the user successively issues position change instructions to the operating unit 14, the process target list update unit 21c can update the display image position information so that images in accordance with the respective position change instructions can be sequentially displayed. It should be noted that an example of an update process for the process target list will be described later.

In the following, the data reading processing unit 22 will be described. The data reading processing unit 22 sequentially carries out a data reading process for a read target image, in which data of the respective read target images is read from an information storage medium and stored in a temporary storage area (buffer) in the memory 12. The data reading processing unit 22 can be realized using the control unit 11, memory 12, and medium information reading unit 13. Note that the temporary storage area in the memory 12, where the data read by the data reading processing unit 22 is stored, is referred to as a storage area B1. Further, the storage area B1 is assumed to include a predetermined number N of unit storage areas each for storing one read data item. With the above, the data reading processing unit 22 can read a maximum of N number of image data items and hold them in the storage area B1.

Here, the read target image refers to, e.g., each of the images in a plurality of positions in an image sequence L, the positions being determined according to the display image position held in the display image position holding unit 21a. As an example, for the display image position being p, the data reading processing unit 22 selects as read target images an image in the display image position p in the image sequence L and a predetermined number of images preceding and subsequent to that image. For example, for the predetermined number being 2, the images I (p−2), I (p−1), I(p), I(p+1), and I(p+2) are determined as read target images.

Further, the data reading processing unit 22 may carry out a data reading process for the respective read target image data in the order determined based on the content of a position change instruction issued by a user. By carrying out the data reading process in the order according to the content of a position change instruction, as described above, the image display device 1 can carry out a data reading process with priority given to an image which is estimated, based on the content of the position change instruction, as highly likely to become a display target. With the above, it is possible to reduce occurrence of a situation in which the user is forced to wait because an image cannot be displayed soon enough as the data reading process for an image which becomes a display target when changing the display images is not completed.

Specifically, for example, the data reading processing unit 22 carries out a data reading process in the order determined according to the direction in which a position in an image sequence L moves, the position being changed according to a position change instruction. With the above, an image which is highly likely to become a display target can be estimated with higher accuracy according to the movement direction of the display image in the image sequence L thus far. As a specific example, when a user has yet to make a position change instruction or the last change instruction is a forward direction instruction, it is highly likely that an image which will next become a display target in response to a user's instruction is one located in the forward direction relative to the display image position. Therefore the data reading processing unit 22 enhances the priority order of an image in the forward direction among those equidistant from the display image position. Meanwhile, when the last position change instruction is a backward direction instruction, it is highly likely that an image which will next become a display target in response to a user's instruction is one located in the backward direction relative to the display image position. Therefore the data reading processing unit 22 enhances the priority order of an image located in the backward direction among those equidistant from the display image position. For example, in the aforementioned example of five read target images, when the last position change instruction is a forward direction instruction, the data reading process is carried out in the order I(p), I(p+1), I(p−1), I(p+2), I(p−2), and when the last position change instruction is a backward direction instruction, the data reading process is carried out in the order I(p), I(p−1), I(p+1), I(p−2), I(p+2).

The data reading processing unit 22 may sequentially read, as read target images, images in a plurality of positions in the image sequence L, the positions being determined according to the display image position and the content of a position change instruction issued by a user. For example, when there is a position change instruction left, among the position change instructions by a user, in response to which an image is yet to be displayed, an image in accordance with that position change instruction should be thereafter displayed, and hence the relevant image data needs to be read with priority. In view of the above, by making as a read target image an image in a position determined according to the content of such a position change instruction, sequential reading of images instructed by a user to be displayed thereafter is achieved.

Further, the data reading processing unit 22 may carry out a data reading process on read target images indicated by the process target list held in the process target list holding unit 21a in the order indicated by the process target list. As described above, by carrying out a data reading process on the read target images sequentially selected based on the process target list, the data reading processing unit 22 can determine image data to be read next, with reference to the process target list every time the data reading process is carried out for one image. With the above, the data reading processing unit 22 no longer needs to determine presence or absence of a position change instruction issued by a user in determining an image to be read next every completion of the data reading process for one image, and consequently image data to be read next can be determined through simpler processing. Note that an example of a process to be specifically carried out by the data reading processing unit 22 when the data reading process is carried out using the process target list will be described later in detail.

In the following, the data format conversion processing unit 23 will be described. The data format conversion processing unit 23 sequentially carries out a data format conversion process on at least one conversion target image in which data of the conversion target image read by the data reading processing 22 and stored in the storage area B1 is converted into a predetermined display data format and stored in a temporary storage area different from the storage area B1 in the memory 12. The data format conversion unit 23 can be realized using the control unit 11 and memory 12.

Here, similar to the read target image, the conversion target image may refer to each of the images in a plurality of positions in the image sequence L, the positions being determined according to the display image position held in the display image position holding unit 21a. In this case, the number of conversion target images may be identical to or fewer than that of the read target image.

Also, similar to the data reading processing unit 22, the data format conversion processing unit 23 may carry out a data format conversion process on conversion target image data in the order determined according to the content of a position change instruction issued by a user. With the above, the image display device 1 can carry out the data format conversion process with priority given to an image which is estimated, based on the content of the position change instruction, as highly likely to become a display target, and hence occurrence of a situation in which the user is forced to wait when changing the display image can be reduced.

Further, the data format conversion processing unit 23, after converting the conversion target image data into a first display data format (hereinafter referred to as a speed prioritized format), converts data of at least one of the conversion target images into data in a second display data format (hereinafter referred to as an image quality prioritized format) different from the first display data format. In this case, it is assumed that image data having been converted into the speed prioritized format is stored in a storage area B2 in the memory 12, and image data having been converted into the image quality prioritized format is stored in a temporary storage area, namely a storage area B3, different from the storage area B2. Note that, similar to the storage area B1, each of the storage areas B2 and B3 contains a predetermined number of unit storage areas each for storing a single converted data item.

Here, it is assumed that the display data format is an image data format in accordance with an image display control process to be carried out by the image display control unit 24 and, e.g., a bit map image format including pixel values of the respective RGB component colors and an α value indicating a degree of semi-transparency for each pixel. Also, the speed prioritized format is assumed to be a display data format in which the size of image data in that format is smaller than that of image data in the image quality prioritized format. The data size of the bit map image format is determined depending on the number of pixels included in the relevant image. Then, for example, the data format conversion processing unit 23 converts image data into a data format for a smaller number of pixels (that is, a smaller image size) as the speed prioritized format.

As an example, the data format conversion processing unit 23 carries out a data format conversion process as described below on image data stored in JPEG format in an information storage medium. That is, image data in JPEG format is converted into a bit map image format, as the speed prioritized format, in which the numbers of pixels in the horizontal and vertical directions, respectively, are half of the original numbers of pixels (a quarter as a whole). Also, the data of the same image is converted into data in a bit map image format, as the image quality prioritized format, in which the number of pixels is equal to that of the original image. With the above, the image data having been converted into the speed prioritized format has a data size a quarter of that of the image data having been converted into the image quality prioritized format. Alternatively, the data format conversion processing unit 23 may convert, according to the predetermined capacity of a unit storage area contained in the storage areas B2 and B3, image data into a format for a data size which allows storage of the image data in the unit storage area.

As described above, by initially converting conversion target image data into the speed prioritized format for a relatively small data size, the image display device 1 can reduce time for transferring data within the device when displaying an image having been converted into that format. With the above, for example, even when a user makes sequential instructions to change display images, it is possible to display a next image, without forcing the user to wait relatively long. Meanwhile, by further converting image data with higher priority into the image quality prioritized format after the data format conversion processing unit 23 completes the data format conversion process to convert the conversion target image into the speed prioritized format, it is possible to display an image in a display data format with priority on image quality when there is no anxiety that the user will be forced to wait. With the above, the image display device 1 can accomplish reduction of the waiting time for a user when changing display images and display of an image with high quality as required.

Also, it is assumed here that similar to the data reading processing unit 22, the data format conversion processing unit 23 carries out the data format conversion process on conversion target images shown in the process target list held in the process target list holding unit 21a in the order indicated by the process target list. With the above, the data format conversion processing unit 23 can determine a conversion target image to be processed next, with reference to the process target list every time the data format conversion process is completed for one image. Hence, even when, for example, the process target list is updated in response to a display target change instruction issued by a user while the data reading processing unit 22 is carrying out the data reading process and consequently the priority order for the process is changed, the data format conversion processing unit 23 can carry out the data format conversion process on a conversion target image determined according to the change. With the above, the image display device 1 can reduce execution of an extra process, compared to a case in which the data reading process and data format conversion process are successively carried out on process target data. It should be noted that an example of a process to be specifically carried out by the data format conversion processing unit 23 when carrying out the data format conversion process, using the process target list, will be described later in detail.

In the following, the image display control unit 24 will be described. The image display control unit 24 carries out an image display control process in which a display target image in accordance with a display target change instruction issued by a user among a plurality of images is displayed on the display device 2, based on image data having been converted into the display data format through the data format conversion process by the data format conversion processing unit 23. The image display control unit 23 can be realized using the control unit 11, image processing unit 15, and display control unit 16.

The image display control unit 24 specifies here a display target image to be displayed next on the display device 2, while referring to the display image position information held in the display image position holding unit 21a. Then, the data obtained by converting the display target image data into the display data format is read from a temporary storage area in the memory 12 and displayed on the display device 2 at a predetermined time. Also, in the case where an image display control process for displaying a new image on the display device 2 is carried out, the image display control unit 24 notifies the process target list update unit 21c of the fact that the process has been carried out. With the above, the process target list update unit 21c can update the process target list and display image position information according to the switching of the images shown on the display device 2.

Also, in the case where the data format conversion processing unit 23 converts image data into either the speed prioritized format or image quality prioritized format, as described above, the image display control unit 24 carries out the following process. That is, in the case where the data of the display target image specified by the display image position information has been converted into the image quality prioritized format and stored in the storage area B3, an image display control process is carried out based on the image data having been converted into the image quality prioritized format. Meanwhile, in the case where the data of the display target image data has not been converted into the image quality prioritized format, an image display control process is carried out based on the image data having been converted into the speed prioritized format and stored in the storage area B2. With the above, when display in the image quality prioritized format is possible, the image display control unit 24 can display an image in the image quality prioritized format, and when it is not, performs display in the speed prioritized format.

In the following, the process target list held in the process target list holding unit 21a and an example of update rule to be referred to by the process target list update unit 21c when updating the process target list will be described.

As a specific example, the process target list is a list showing a predetermined number of read target images arranged according to priority order for processing the images. A predetermined number of images among those included in the process target list, beginning with one with the highest priority order are assumed to also be conversion target images.

The priority order is determined as follows based on, e.g., the display image position information held in the display image position holding unit 21a and a position change instruction issued by a user. That is, initially, an image indicated by the display image position information is given the highest priority order and added to the process target list (rule 1). Then, when there is any unprocessed position change instruction, that is, one not yet used in determination of the display image position, remaining, an image indicated by the position change instruction and to be subsequently made a display target is given second or later priority order subsequent to the image indicated by the display image position information and added to the process target list (rule 2). Note that an image instructed to become a display target twice or more among those to sequentially become display targets is added to the process target list only when the image first becomes a display target.

Further, subsequent priority orders will be determined as described below. That is, an image, among images yet to be added to the process target list, which is adjacent to an image in the image sequence L, already added to the process target list and which is located in the direction instructed by the last position change instruction when viewed from the display image position is next added to the process target list (rule 3). Note that when no position change instruction is issued yet, an image in the reference direction (e.g., the forward direction), instead of the direction instructed by the last position change instruction, is added to the process target list. Thereafter, an image which is adjacent to an image already added to the process target list and which is located in the direction opposite the direction instructed by the last position change instruction when viewed from the display image position is added to the process target list (rule 4). The procedures according to the rules 3 and 4 are thereafter repeated, whereby an image is added to the process target list (rule 5).

Figure 4:
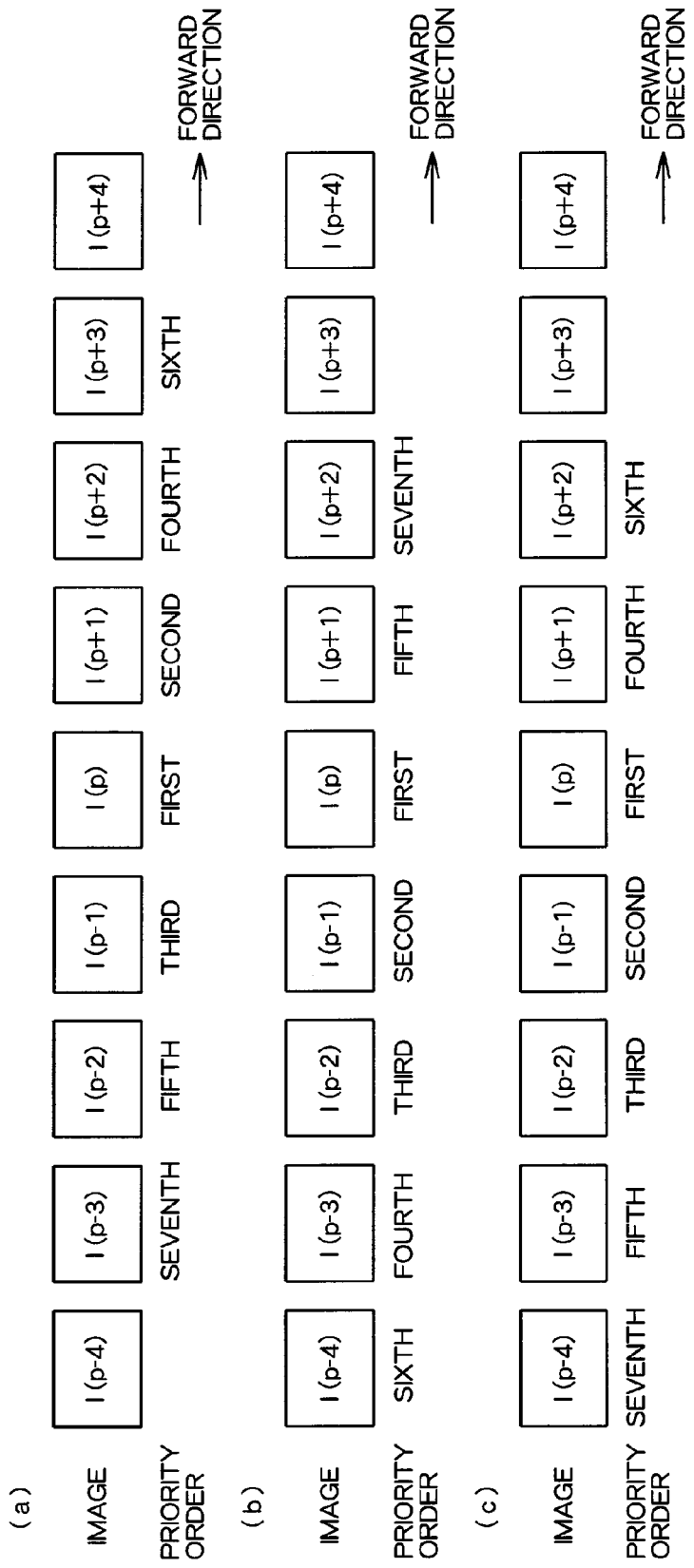
FIG. 4 is a diagram explaining an example of a priority order shown in the process target list, of an image included in an image sequence.

FIGS. 4(a), 4(b), and 4(c) are diagrams explaining the priority orders of the images included in the process target list determined according to the above described rules. These diagrams all show images forming an image sequence L with p as the center when the display image position information indicates p. Also, the right side, when facing the diagram, corresponds to the forward direction of the image sequence L. The number attached below each image indicates the priority order in the process target list, and an image without a number is an image not included in the process target list. The process target list is assumed here to include seven images as read target images.

FIG. 4(a) shows an example of a process target list with no position change instruction issued. In this case, the image I(p) is given the first priority order according to the rule 1. No image is added to the process target list according to the rule 2 because no position change instruction is issued. Further, the image I(p+1) located in the reference direction is given the second priority order according to the rule 3; the image I(p−1) is given the third priority order according to the rule 4. Images with the fourth and subsequent priority orders are determined as shown according to the rule 5.

FIG. 4(b) shows an example of a case in which key buffer information indicating two backward direction instructions is held as an unprocessed position change instruction. In this case, the image I(p) is given the first priority order according to the rule 1; the images I(p−1) and I(p−2) in accordance with the unprocessed position change instructions are given the second and third priority orders, respectively, according to the rule 2. Further, since the last position change instruction is a backward direction instruction, the images I(p+1) and I(p−3) are given the fourth and fifth priority orders, respectively, according to the rules 3 and 4.

FIG. 4(c) shows an example of a case in which key buffer information sequentially indicating a backward direction instruction, a backward direction instruction, and a forward direction instruction as unprocessed position change instructions is held. In this case, priority orders up to the third are determined in the manner similar to that in the case shown in FIG. 4(b), and subsequent priority orders are determined such that the fourth and fifth are switched from those in the case shown in FIG. 4(b) because the last position change instruction is a forward direction instruction. That is, the image I(p+1) is given the fourth priority order according to the rule 3 and the image I(p−3) is given the fifth priority order according to the rule 4.

Although the process target list update unit 21c may produce a process target list according to the above described rules every reception of a new position change instruction or information from the image display control unit 24 indicating that an image display control process is carried out, the process target list may alternatively be updated using a rule table held in advance in the memory 12. For example, the rule table is a table for associating with each other information indicating an unprocessed position change instruction and information indicating, by means of a relative position to the display image position, an image forming the process target list determined according to the above described rules. The process target list update unit 21c can update the process target list with reference to the rule table, based on the unprocessed position change instruction information held in the key buffer information at the time of the update, and the display image position information.

In the following, a specific example of the flow of a process to be carried out by the data reading processing unit 22, data format conversion processing unit 23, and image display control unit 24 will be described.

Initially, a storage area managing table used by the data reading processing unit 22, data format conversion processing unit 23, and image display control unit 24 in the process to be described below will be described. The storage area managing table T1 is a table containing information specifying image data stored in the storage area B1. The storage area managing table T1 is stored in the memory 12, and available to be referred to and updated by the data reading processing unit 22 and data format conversion processing unit 23.

As one example, as shown in FIG. 5, the storage area managing table T1 is a table for associating area identification information specifying each unit storage area in the storage area B1, image identification information specifying image data stored in the concerned unit storage area, and status information indicating the state of the concerned unit storage area, with one another. The status information is information indicating, as the state of the unit storage area, "vacant area", "in reading processing", "reading process completed", "in conversion processing", and "conversion process completed", and is updated by the data reading processing unit 22 and data format conversion processing unit 23. When no data is stored in the unit storage area or the stored data can be deleted, the status information indicates "vacant area". While the data reading processing unit 22 is storing, e.g., the data D(p) of the image I(p) in one of the unit storage areas, information "in reading processing" is stored in the storage area managing table T1 as status information associated with the unit storage area. When the data reading processing unit 22 completes the data reading processing, the status information is updated to "reading process completed". When the data format conversion processing unit 23 begins data format conversion processing with respect to the data D(p) stored in the concerned unit storage area, the status information is updated to "in conversion processing", and when the data format conversion processing is completed, the status information is updated to either "conversion process completed" or "vacant area" according to the determination condition to be described later.

The storage area managing table T2 is a table containing information specifying image data stored in the storage areas B2 and B3. The storage area managing table T2 is stored in the memory 12, and available to be referred to or updated by the data format conversion processing unit 23 and image display control unit 24.

As one example, the storage area managing table T2 is a table for making associating with one another area identification information specifying each unit storage area in the storage areas B2 and B3, image identification information specifying image data stored in the concerned unit storage area, and status information indicating the state of the concerned unit storage area. The status information is information indicating, as the state of data, "vacant area", "in conversion processing", "conversion process completed", and "in display processing" and updated by the data format conversion processing unit 23 and image display control unit 24. When no data is stored in the unit storage area or the stored data is determined available to be deleted, the status information indicates "vacant area". Supposing that the data format conversion processing unit 23 is carrying out a data format conversion process on, e.g., the image I(p) and the converted image data is being stored in one of the unit storage areas in the storage area B2 or B3, information indicating "in conversion processing" is stored in the storage area managing table T2 as status information associated with the unit storage area. When the data conversion processing unit 23 completes the data format conversion process, the status information is updated to "conversion process completed". When the image display control unit 24 begins image display control processing with respect to the converted data stored in the concerned unit storage area, the status information is updated to "in display processing", and when the image display control processing is completed, the image display control unit 24 updates the status information to either "conversion process completed" or "vacant area" depending on the determination condition to be described later.

Figure 6:
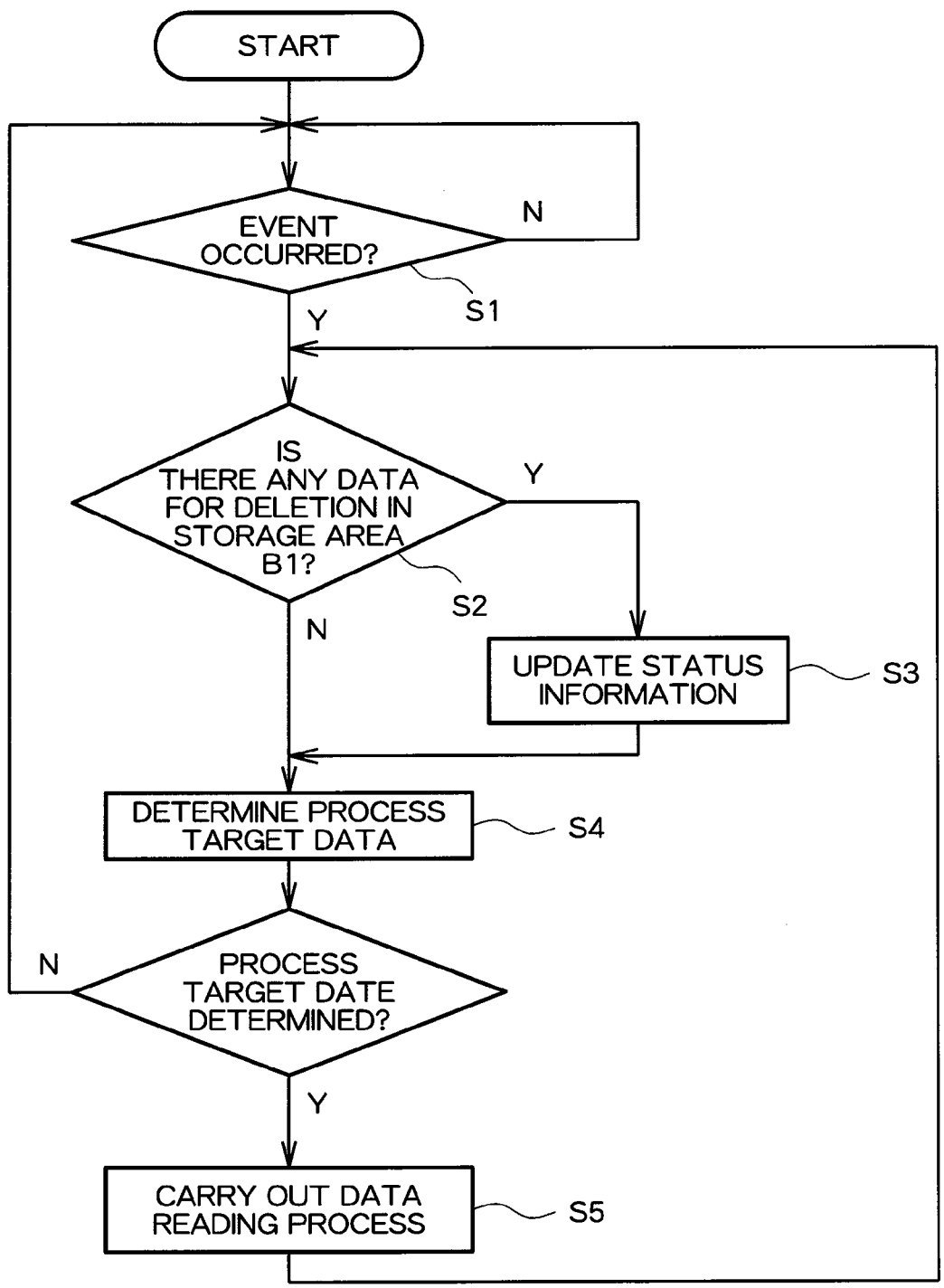
FIG. 6 is a flowchart of one example of a process to be carried out by a data reading processing unit.

In the following, an example of the flow of a process to be carried out by the data reading processing unit 22 will be described based on the flowchart shown in FIG. 6.

The data reading processing unit 22, after beginning the processing, waits for occurrence of an event which triggers determination as to whether or not to carry out a data reading process (S1). Specifically, in the case where the process target list update unit 21c has updated the process target list and where the data format conversion processing unit 23 has changed the status information for one of the unit storage areas in the storage area B1 to "vacant area", occurrence of such an event is determined.

When it is determined in the process at S1 that an event occurs, the data reading processing unit 22 determines whether or not there is any data which can be deleted stored in the storage area B1, with reference to the process target list (S2). Specifically, the information about an image whose data is stored in the storage area B1 indicated by the storage area managing table T1 is compared to the information about the read target image indicated by the process target list. Then, when the data of an image not included in the read target image at the time of determination is stored in the storage area B1 and the status information for the unit storage area where the data is stored indicates "reading process completed" or "conversion process completed", that data is determined as available to be deleted. When it is determined that data available to be deleted is stored in the storage area B1, the data reading processing unit 22 changes the status information for the unit storage area where the data is stored to "vacant area" (S3).

Thereafter, the data reading processing unit 22 determines data which should be made a target of a data reading process, while referring to the process target list and storage area managing table T1 (S4). Specifically, when there is a unit storage area having status information "vacant area" stored in the storage area B1 and there is an image of which data is not stored in the storage area B1 among the read target images shown in the process target list, image data which is determined, according to the order indicated by the process target list, as most antecedent among the images is selected as process target data.

When data to become a target of the data reading process cannot be determined in the process at S4, the data reading processing unit 22 returns to the process at S1 to wait for occurrence of a new event. Meanwhile, when a process target data to become a target of the data reading process is determined in the process at S4, the data reading process is carried out on the determined process target data (S5). With the data reading process completed, the data reading processing unit 22 returns to the process at S2 and repeats the determination whether or not there is any process target data left to which the data reading process can be carried out. Note that the above described process is repeated until the image display device 1 completes the entire image display process in response to an instruction operation by a user, or the like.

Figure 7:
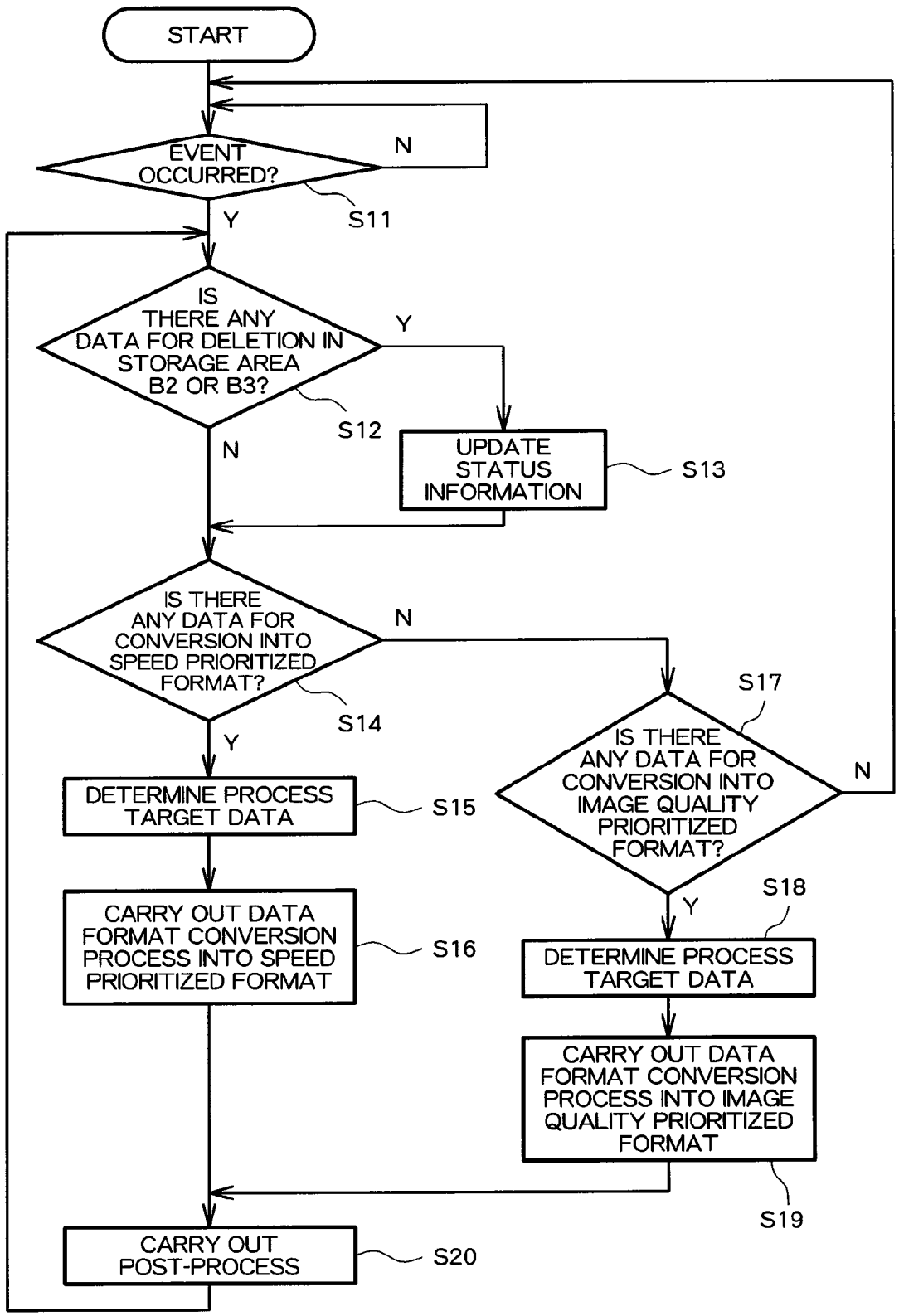
FIG. 7 is a flowchart of one example of a process to be carried out by a data format conversion processing unit.

In the following, an example of the flow of a process to be carried out by the data format conversion processing unit 23 will be described based on the flowchart of FIG. 7.

The data format conversion processing unit 23, after beginning the processing, waits for occurrence of an event which triggers determination whether or not to carry out a data format conversion process (S11). Specifically, when the process target list update unit 21c has updated the process target list, when the data reading processing unit 22 has completed the data reading processing and any status information included in the storage area managing table T1 has been updated to "reading process completed", and when any status information included in the storage area managing table T2 has been updated to "vacant area", occurrence of an event is determined.

When it is determined in the process at S11 that an event occurs, the data format conversion processing unit 23 determines whether or not data available to be deleted is stored in the storage area B2 or B3, while referring to the process target list (S12). Specifically, the information about an image whose data is stored in the storage areas B2 and B3 indicated by the storage area managing table T2 is compared to the information about the conversion target image indicated by the process target list. When data of an image not included in the conversion target images at the time of the determination is stored in the storage area B2 or B3 and the status information for the unit storage area where the data is stored indicates "conversion process completed", the data is determined as available to be deleted. When it is determined that data available to be deleted is stored in the storage area B2 or B3, the data format conversion processing unit 23 changes the status information for the unit storage area where the data is stored to "vacant area" (S13).

Thereafter, the data format conversion processing unit 23 determines whether or not there is any data which should be made a target of a data format conversion process to convert into the speed prioritized format, while referring to the process target list and storage area managing table T2 (S14). Specifically, in the case where there is a unit storage area with status information "vacant area" in the storage area B2 and there is an image, among the conversion target images indicated by the process target list, whose data is not stored in the storage area B2 but read and stored in the storage area B1 with status information "reading process completed", it is determined that data which should be made a process target is present.

When it is determined in the process at S14 that there is data which should be made a process target, data of an image which is determined, according to the order indicated by the process target list, as most antecedent among the process target data is determined as a target of the data format conversion process (S15). Then, the data format conversion process to convert into the speed prioritized format is carried out on the determined data (S16).

Meanwhile, when it is determined in the process at S14 that there is no data which should be made a process target, the data format conversion processing unit 23 next determines whether or not there is any data which should be made a target of a data format conversion process to convert into the image quality prioritized format (S17). Specifically, when there is a unit storage area having status information "vacant area" in the storage area B3, and there is an image, among the conversion target images indicated by the process target list, of which data is not stored in the storage area B3 but read and stored in the storage area B1 with status information "reading process completed", it is determined that there is data which should be made a process target.

When it is determined in the process at S17 that there is no data which should be made a process target, the data format conversion processing unit 23 returns to the process at S11 to wait for occurrence of a new event. Meanwhile, when it is determined in the process at S17 that there is data which should be made a process target, data of an image which is determined, according to the order indicted by the process target list, as most antecedent among the process target data is determined as a target of the data format conversion process (S18). Then, the data format conversion process for converting into the image quality prioritized format is carried out on the determined data (S19).

In the case where the data format conversion process at S16 or S19 is carried out, the data format conversion processing unit 23 carries out a post-process (S20). Specifically, in the case where the displayed image is indicated as a read target image in the process target list, the status information shown in the storage area managing table T1 for the unit storage area where the image is stored is updated to "conversion process completed". Meanwhile, in the case where the displayed image is not indicated as a read target image in the process target list, the status information shown in the storage area managing table T2 for the unit storage area where the image is stored is updated to "vacant area". The data format conversion processing unit 23 thereafter returns to the process at S12, and repeats the determination as to whether or not there is any other data on which the data format conversion process can be carried out.

Figure 8:
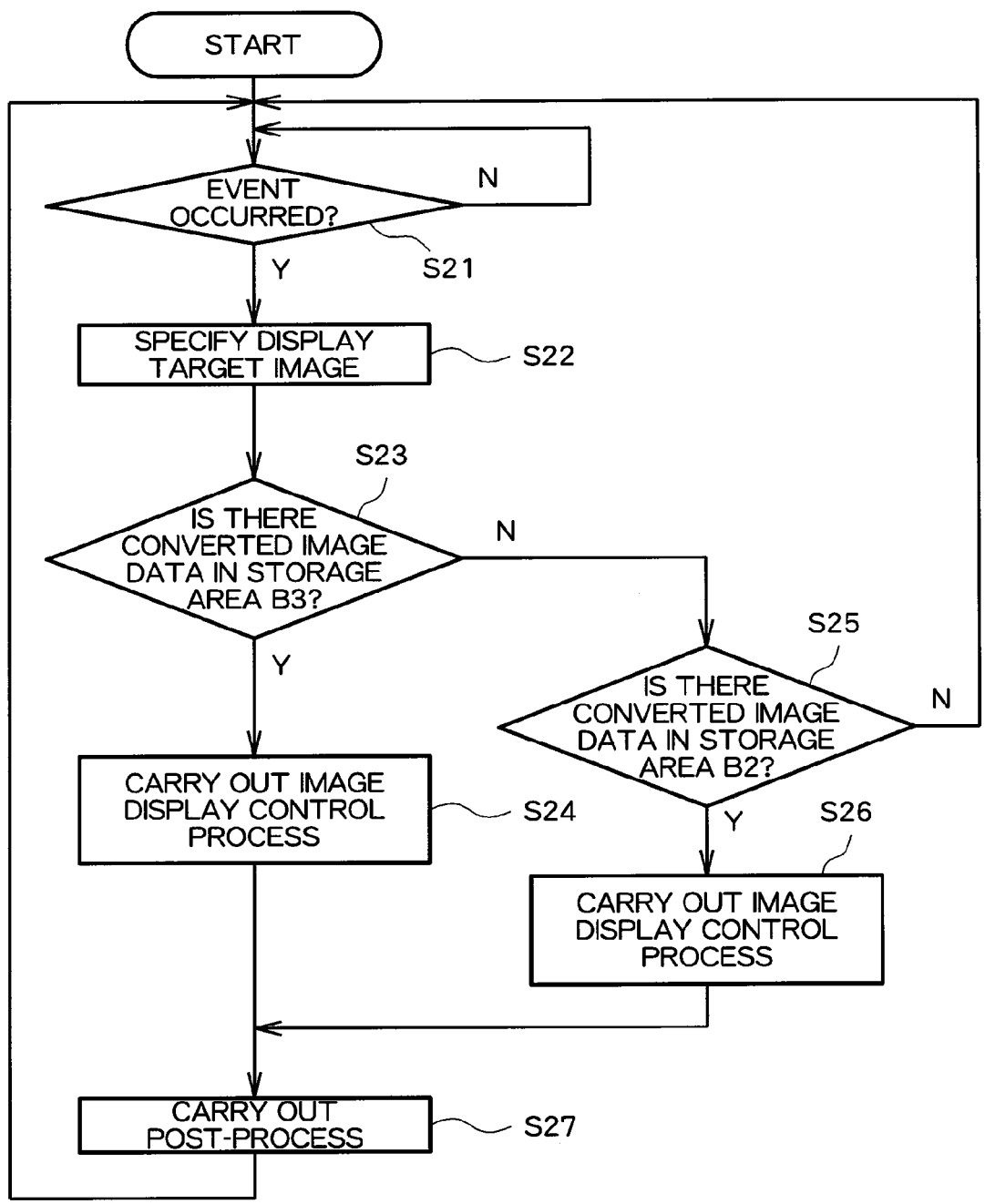
FIG. 8 is a flowchart of one example of a process to be carried out by an image display control unit.

In the following, an example of the flow of a process to be carried out by the image display control unit 23 will be described based on the flowchart shown in FIG. 8.

The image display control unit 24, after beginning the processing, waits for occurrence of an event which triggers determination as to whether or not to carry out an image display control process (S21). Specifically, in the case where a signal, e.g., a vertical synchronizing signal and the like, has been input, occurrence of such an event is determined.

When it is determined in the process at S21 that an event occurs, the image display control unit 24 specifies an image which should be made a display target, while referring to the display image position information held in the display image position holding unit 21a (S22). Then, whether or not the converted image data is stored in the storage area B3 with status information "conversion process completed" is determined (S23). When the converted data is stored in the storage area B3 with status information "conversion process completed", an image display control process for displaying an image on the display device 2 is carried out based on the data (S24). With the above, the image display control unit 24 can display an image in the image quality prioritized format.

Meanwhile, when there is no converted data stored in the storage area B3, the image display control unit 24 determines whether or not converted data is stored in the storage area B2 with status information "conversion process completed" (S25). When no converted data is stored in the storage area B2 with state information "conversion process completed", the image display control unit 24 returns to the process at S21 to wait for occurrence of a new event. Meanwhile, when it is determined in the process at S25 that converted data is stored in the storage area B2, the image display control unit 24 carries out an image display control process to display an image on the display device 2 based on the data (S26).

In the case where the image display control process at S24 or S26 is carried out, the image display control unit 24 carries out a post-process (S27). Specifically, in the case where the displayed image is indicated as a conversion target image in the process target list, the status information shown in the storage area managing table T2 for the unit storage area where the image is stored is returned to "conversion process completed". Meanwhile, when the displayed image is not indicated as a conversion target image in the process target list, the status information shown in the storage area managing table T2 for the unit storage area where the image is stored is updated to "vacant area". In either case, the process target list update unit 21c is notified of the fact that the image display control process has been carried out. Thereafter, the image display control unit 24 returns to the process at S21, and waits for occurrence of a new event.

It should be noted that the present invention is not limited to the above described embodiment and can be realized in various embodiments. For example, although it is described in the above that each of the storage areas B1, B2, B3 has a predetermined number of unit storage areas each for storing data of one image, data may be stored in any different manner. For example, the storage area B1 may be an area for which an upper limit data size is predetermined, and the number of data items to be stored in the area may be changeable. In this case, as one example, the storage area managing table is assumed to be a table for associating with each other information identifying the data stored in the storage area and address information indicating a position where the data is stored in the storage area. Also in this case, the process target list is assumed to be a list in which the number of read target images, the number depending on the maximum number of data items which can be stored in the storage area, are aligned according to the priority order.

The invention claimed is:

1. An image display device for displaying, on display means, an image in accordance with a position change instruction issued by a user to change a position in an image sequence comprising a plurality of images, comprising:
    display image position holding means for holding information about a display image position, which is a position in the image sequence, of an image to be displayed next and determined according to an image being displayed on the display means and the position change instruction;
    reading processing means for carrying out a data reading process for respective images in a plurality of positions in the image sequence, the positions being determined according to the display image position, in which data of the respective images are read from image data storage means in an order determined according to content of the position change instruction, the image data storage means storing data of the plurality of images;
    image display control means for displaying an image in accordance with the position change instruction on the display means, based on the read image data;
    a process target list indicating read target images from the image sequence on which the data reading process is to be carried out and a priority order in which the read target images are to be read; and
    process target list update means or updating the priority order for each image on the process target list according to the position change instruction;
    wherein the position change instruction indicates a single movement in a first direction along the image sequence relative to the image being displayed;
    wherein no other movements after the single movement in the first direction occur;
    wherein the order is automatically determined by said display device such that an image located in the first movement direction from the image being displayed is added to the list followed by an image located in the direction opposite the first movement direction from the image being displayed, as a result of said single movement in said first direction;
    wherein the reading processing means carries out the data reading process on the read target images indicated by the process target list in the order indicated by the process target list.

2. The image display device according to claim 1, wherein the plurality of positions are determined according to the content of the position change instruction.

3. The image display device according to claim 1, further comprising:
    data format conversion means for converting, for respective images in the plurality of positions in the image sequence, the positions being determined according to the display image position, data of the respective images read through the data reading process into a display data format in an order determined according to the content of the position change instruction;
    wherein
    the image display control means displays an image in accordance with the position change instruction on the display means, based on the converted image data.

4. The image display device of claim 1 wherein a first image corresponding to an initial display image position is given the highest priority in the order and initially added to the process target list.

5. The image display device of claim 4 wherein, when an unprocessed position change instruction not yet used in determining display image position exists, a second image in the direction of the unprocessed position change instruction is given the second highest priority and added to the process target list.

6. The image display device of claim 5 wherein a third image located in the direction indicated by the position change instruction relative to the initial display image position is given the third highest priority and added to the process target list.

7. An image display method for displaying, on display means, an image in accordance with a position change instruction issued by a user to change a position in an image sequence comprising a plurality of images, comprising:

storing, in display image position holding means, information about a display image position which is a position in the image sequence, of an image to be displayed next and determined according to an image being displayed on the display means and the position change instruction;

selecting a predetermined number of images temporally preceding and temporally subsequent to the position of the display image as read target images on which a data reading process is to be carried out;

carrying out a data reading process for respective images in a plurality of positions in the image sequence, the positions being determined according to the display image position, in which data of the respective images are read from image data storage means in an order determined according to content of the position change instruction, the image data storage means storing data of the plurality of images;

holding a process target list indicating read target images from the image sequence on which the data reading process is to he carried out and a priority order in which the read target images are to be read;

displaying an image in accordance with the position change instruction on the display means, based on the read image data; and updating the priority order for each image on the process target list according to the position change instruction;

wherein the position change instruction indicates a single movement in a first direction along the image sequence relative to the image being displayed, wherein said single movement in the first direction is either in a forward or backward direction with respect to time;

wherein said single movement in the first direction causes a first image to be added to the process target list which is in said first movement direction;

wherein no other movements after the single movement in the first direction occur;

wherein said single movement in the first direction causes a second image to be added to the process target list which is in a direction opposite to said first movement direction;

wherein the data reading process is carried out on the read target images indicated by the process target list in the order indicated by the process target list.

8. The image display method for displaying according to claim 7, wherein said image added in the movement direction is added before said image added in the direction opposite to the movement direction.

9. The image display method for displaying according to claim 7, wherein said single movement in a first direction is in the forward direction.

10. A non-transitory computer storage medium storing a program for causing a computer to function as an image display device for displaying, on display means, an image in accordance with a position change instruction issued by a user to change a position in an image sequence comprising a plurality of images, the computer functioning as:

display image position holding means for holding information about a display image position which is a position in the image sequence, of an image to be displayed next and determined according to an image being displayed on the display means and the position change instruction;

reading processing means for carrying out a data reading process for respective images in a plurality of positions in the image sequence, the positions being determined according to the display image position, in which data of the respective images are read from image data storage means in an order determined according to content of the position change instruction, the image data storage means storing data of the plurality of images;

image display control means for displaying an image in accordance with the position change instruction on the display means, based on the read image data;

a process target list indicating read target images from the image sequence on which the data reading process is to be carried out and a priority order in which the read target images are to be read; and process target list update means for updating the priority order for each image on the process target list according to the position change instruction;

wherein the image sequence comprises a plurality of still images;

wherein the position change instruction indicates a single movement in a first direction along the image sequence relative to the image being displayed;

wherein no other movements after the single movement in the first direction occur;

wherein the order is automatically determined by said display device such that an image located in the first movement direction from the image being displayed is added to the list followed by an image located in the direction opposite the first movement direction from the image being displayed, as a result of said single movement in said first direction;

wherein the reading processing means carries out the data reading process on the read target images indicated by the process target list in the order indicated by the process target list.

11. An image display device for displaying, on display means, an image in accordance with a display target change instruction issued by a user, among a plurality of images, comprising:

data format conversion means for, after converting data of at least one conversion target image included in the plurality of images into a first display data format and then storing in a first temporary storage area, converting data of at least one image included in the conversion target images into a second display data format different from the first display data format and then storing in a second temporary storage area different from the first temporary storage area;

image display control means for displaying a display target image in accordance with the display target change instruction on the display means, based on the converted image data, in which the display target image is displayed on the display means based on, when data of the display target image has been converted into the second display data format, the data of the image having been converted into the second display data format, and when the data of the display target image has not been converted into the second display data format, based on the data of the image having been converted into the first display data format;

a process target list indicating conversion target images on which the data format conversion process is to be carried out and a priority order in which the conversion target images are to be converted; and process target list update means for updating the priority order for each image on the process target list according to the display target change instruction;

wherein the display target change instruction indicates a single movement in a first direction among the plurality of images relative to an image being displayed;

wherein no other movements after the single movement in the first direction occur;

wherein the order is automatically determined by said display device such that an image located in the first movement direction from the image being displayed is added to the list followed by an image located in the direction opposite the first movement direction from the image being displayed, as a result of said single movement in said first direction;

wherein the data format conversion means carries out the conversion process on the conversion target images indicated by the process target list in the order indicated by the process target list.

12. The image display device according to claim 11, wherein the data of the image having been converted into the first display data format has a data size smaller than a data size of the data of the image having been converted into the second display data format.

13. An image display method for displaying, on display means, an image in accordance with a display target change instruction issued by a user, among a plurality of images, comprising:

selecting a predetermined number of images preceding and subsequent to the position of a display image as conversion target images on which a data format conversion process is to be carried out;

after converting data of at least one conversion target image included in the plurality of images into a first display data format and then storing in a first temporary storage area, converting data of at least one image included in the conversion target images into a second display data format different from the first display data format and then storing in a second temporary storage area different from the first temporary storage area;

holding a process target list indicating conversion target images on which the data format conversion process is to be carried out and a priority order in which the conversion target images are to be converted;

displaying a display target image in accordance with the display target change instruction on the display means, based on the converted image data, in which the display target image is displayed on the display means based on, when data of the display target image has been converted into the second display data format, the data of the image having been converted into the second display data format, and when the data of the display target image has not been converted into the second display data format, based on the data of the image having been converted into the first display data format; and updating the priority order for each image on the process target list according to the display target change instruction;

wherein the display target change instruction indicates a single movement in a first direction among the plurality of images relative to an image being displayed;

wherein no other movements after the single movement in the first direction occur;

wherein the order is automatically determined by a display device such that an image located in the first movement direction from the image being displayed is added to the list followed by an image located in the direction opposite the first movement direction from the image being displayed, as a result of said single movement in said first direction;

wherein the data format conversion means carries out the conversion process on the conversion target images indicated by the process target list in the order indicated by the process target list.

14. A non-transitory computer storage medium storing a program for causing a computer to function as an image display device for displaying, on display means, an image in accordance with a display target change instruction issued by a user, among a plurality of images, the computer functioning as:

data format conversion means for, after converting data of at least one conversion target image included in the plurality of images into a first display data format and then storing in a first temporary storage area, converting data of at least one image included in the conversion target images into a second display data format different from the first display data format and then storing in a second temporary storage area different from the first temporary storage area;

image display control means for displaying a display target image in accordance with the display target change instruction on the display means, based on the converted image data, in which the display target image is displayed on the display means based on, when data of the display target image has been converted into the second display data format, the data of the image having been converted into the second display data format, and when the data of the display target image has not been converted into the second display data format, based on the data of the image having been converted into the first display data format; and a process target list indicating conversion target images on which the data format conversion process is to be carried out and a priority order in which the conversion target images are to be converted;

process target list update means for updating the priority order for each image on the process target list according to the display target change instruction;

wherein the display target change instruction indicates a single movement in a first direction among the plurality of images relative to an image being displayed;

wherein no other movements after the single movement in the first direction occur;

wherein the order is automatically determined by said display device such that an image located in the first movement direction from the image being displayed is added to the list followed by an image :located in the direction opposite the first movement direction from the image being displayed, as a result of said single movement in said first direction;

wherein the data format conversion means carries out the conversion process on the conversion target images indicated by the process target list in the order indicated by the process target list.

15. An information processing device for sequentially carrying out a first process and a second process on a plurality of process target data, comprising:

priority order list holding means for holding a priority order list indicating a priority order for the first and second processes on the plurality of process target data;

first process execution means for carrying out the first process on process target data sequentially selected from the plurality of process target data, based on the priority order list, and storing a result of processing in a temporary storage area;

priority order list update means for updating the priority order list upon occurrence of a predetermined event;

second process execution means for carrying out the second process on a result of processing sequentially selected from the results of processing stored in the temporary storage area, based on the updated priority order list; and image display control means for displaying, on display means, a display target image in accordance with a display target change instruction issued by a user, among a plurality of images, wherein the process target data is data of the image;

the display target change instruction indicates a single movement in a first direction among the plurality of images relative to an image being displayed;

wherein no other movements after the single movement in the first direction occur;

wherein the priority order is automatically determined by said information processing device such that an image located in the first movement direction from the image being displayed is added to the list followed by an image located in the direction opposite the first movement direction from the image being displayed, as a result of said single movement in said first direction;

wherein the first process execution means carries out the process on the process target data indicated by the priority order list in the order indicated by the priority order list;

wherein the priority order for each image on the process target list is updated according to the display target change instruction.

16. The information processing device according to claim 15, wherein the first process is a data reading process for reading the data of the image from image data storage means for storing data of the plurality of images, the second process is a data format conversion process for converting he read image data into a display data format, the predetermined event is the display target change instruction, and the image display control means displays on the display means the display target image, based on the data of the image, the data being converted through the data format conversion process.

17. An information processing method for sequentially carrying out a first process and a second process on a plurality of process target data, comprising:

holding, in priority order list holding means, a priority order list indicating a priority order for the first and second processes on the plurality of process target data;

sequentially selecting process target data corresponding to positions preceding and subsequent to the position of a display target; and carrying out the first process on process target data sequentially selected from the plurality of process target data, based on the priority order list, and storing a result of processing in a temporary storage area;

updating the priority order list upon occurrence of a predetermined event;

carrying out the second process on a result of processing sequentially selected from the results of processing stored in the temporary storage area, based on the updated priority order list; and displaying, on display means, a display target image in accordance with a display target change instruction issued by a user, among a plurality of images;

wherein the process target data is data of the image;

the display target change instruction indicates a single movement in a first direction among the plurality of images relative to an image being displayed;

wherein no other movements after the single movement in the first direction occur;

wherein the priority order is automatically determined by an information processing device such that an image located in the first movement direction from the image being displayed is added to the list followed by an image located in the direction opposite the first movement direction from the image being displayed, as a result of said single movement in said first direction;

wherein the first process execution means carries out the process on the process target data indicated by the priority order list in the order indicated by the priority order list;

wherein the priority order for each image on the process target list is update according to the display target change instruction.

18. A non-transitory computer storage medium storing a program for causing a computer to function as an information processing device for sequentially carrying out a first process and a second process on a plurality of process target data, the computer functioning as:

priority order list holding means for holding a priority order list indicating a priority order for the first and second processes on the plurality of process target data;

first process execution means for carrying out the first process on process target data sequentially selected from the plurality of process target data, based on the priority order list, and storing a result of processing in a temporary storage area;

priority order list update means for updating the priority order list upon occurrence of a predetermined event;

second process execution means for carrying out the second process on a result of processing sequentially selected from the results of processing stored in the temporary storage area, based on the updated priority order list;

image display control means for displaying, on display means, a display target image in accordance with a display target change instruction issued by a user, among a plurality of images, wherein the process target data is data of the image;

the display target change instruction indicates a single movement in a first direction among the plurality of images relative to an image being displayed;

wherein no other movements after the single movement in the first direction occur;

wherein the priority order is automatically determined by said information processing device such that an image located in the first movement direction from the image being displayed is added to the list followed by an image located in the direction opposite the first movement direction from the image being displayed, as a result of said single movement in said first direction;

wherein the first process execution means carries out the process on the process target data indicated by the priority order list in the order indicated by the priority order list, wherein the priority order for each image on the process target list is updated according to the display target change instruction.

* * * * *

UNITED STATES PATENT AND TRADEMARK OFFICE
CERTIFICATE OF CORRECTION

PATENT NO. : 9,099,059 B2  Page 1 of 1
APPLICATION NO. : 12/298124
DATED : August 4, 2015
INVENTOR(S) : Koichi Sato It is certified that error appears in the above-identified patent and that said Letters Patent is hereby corrected as shown below:

In the Claims,

Column 20, Line 14, Claim 1, delete "or" and insert --for--, therefor.

Column 21, Line 21, Claim 7, delete "he" and insert --be--, therefor.

Column 24, Line 47, Claim 14, delete ":located" and insert --located--, therefor.

Column 25, Line 39, Claim 16, delete "he" and insert --the--, therefor.

Column 26, Line 20, Claim 17, delete "update" and insert --updated--, therefor.

Column 26, Line 63, Claim 18, delete "list," and insert --list;--, therefor.

Signed and Sealed this
Eighth Day of March, 2016

Michelle K. Lee
*Director of the United States Patent and Trademark Office*